US006810387B1

(12) United States Patent
Yim

(10) Patent No.: US 6,810,387 B1
(45) Date of Patent: Oct. 26, 2004

(54) COPY PREVENTION APPARATUS AND METHOD IN DIGITAL BROADCASTING RECEIVING SYSTEM

(75) Inventor: Myung-Sik Yim, Sungnam (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/453,891

(22) Filed: Mar. 14, 2000

(30) Foreign Application Priority Data

Sep. 14, 1999 (KR) .............................. 99-39346

(51) Int. Cl.[7] .......................... G06F 17/60; H04K 1/00; H04L 9/00
(52) U.S. Cl. .......................... 705/57; 705/50; 380/232; 713/250
(58) Field of Search .......................... 705/57; 713/200, 713/201; 380/232, 228

(56) References Cited

U.S. PATENT DOCUMENTS

| 5,917,915 A | * | 6/1999 | Hirose .......................... 380/228 |
| 6,014,442 A | * | 1/2000 | Enari .......................... 380/216 |
| 6,069,956 A | * | 5/2000 | Kurihara .......................... 380/212 |
| 6,215,530 B1 | * | 4/2001 | Wasilewski .................. 348/731 |
| 6,266,480 B1 | * | 7/2001 | Ezaki et al. .................... 360/60 |
| 6,266,813 B1 | * | 7/2001 | Ihara .......................... 725/146 |
| 6,286,103 B1 | * | 9/2001 | Maillard et al. ............. 713/200 |
| 6,298,400 B1 | * | 10/2001 | Candelore .................... 713/600 |
| 2003/0126445 A1 | * | 7/2003 | Wehrenberg ................ 713/176 |

FOREIGN PATENT DOCUMENTS

| GB | 0 322 030 A | 8/1998 | .......... H04N/5/913 |
| WO | 99/16244 | 4/1999 | .......... H04N/5/913 |
| WO | 99/18729 | 4/1999 | ............ H04N/7/16 |
| WO | 99/35647 | 7/1999 | ........... G11B/23/28 |
| WO | WO 200213529 A1 | * | 2/2002 | ........... G06F/17/30 |
| WO | WO 200247356 A2 | * | 6/2002 | ............. H04L/9/18 |

OTHER PUBLICATIONS

Mooij, W.G.P., DVD Security: Advancing content mamagement and protection, Broadcast Engineering, Apr. 1999, p. 34–35.*
Parker, Dana, DVD Copy Protection: An agreement at last, Emedia, v9, n12, pp. 89–90.*
Copyright issue heat up in firrewire circles: proposal from intel and sony lead discussion, Multimedia Week, v6, n38, p. 1.*

* cited by examiner

*Primary Examiner*—James P. Trammell
*Assistant Examiner*—Firmin Backer
(74) *Attorney, Agent, or Firm*—Sughrue Mion, PLLC

(57) ABSTRACT

A copy prevention apparatus and method in a digital broadcasting receiving system protects information stored in a storage medium from being illegally duplicated by an unauthorized third party. The copy prevention apparatus includes a demultiplexer for descrambling scrambled transport stream (TS) patterned data of a user selective and desired channel among a received multi-channel broadcasting and outputting the descrambled result, a scrambler for scrambling again the descrambled TS patterned data from the TS demultiplexer, a key encryption unit for decrypting the encrypted key of the scrambler and encrypting the decrypted key again, to thereby produce a new encryption key, and a system controller for controlling a storage medium to store the scrambled TS patterned data from the scrambler together with the encrypted scrambler key output from the key encryption unit during storing. Thus, the copy prevention apparatus and method in the digital broadcasting receiving system scrambles again a descrambled data stream in a specific method and stores the scrambled result, when a received broadcasting signal is stored in a storage medium such as a hard disc drive (HDD) or a DVD-RAM drive, to thereby provide an effect of preventing an unauthorized person from copying the information stored in the storage medium.

12 Claims, 4 Drawing Sheets

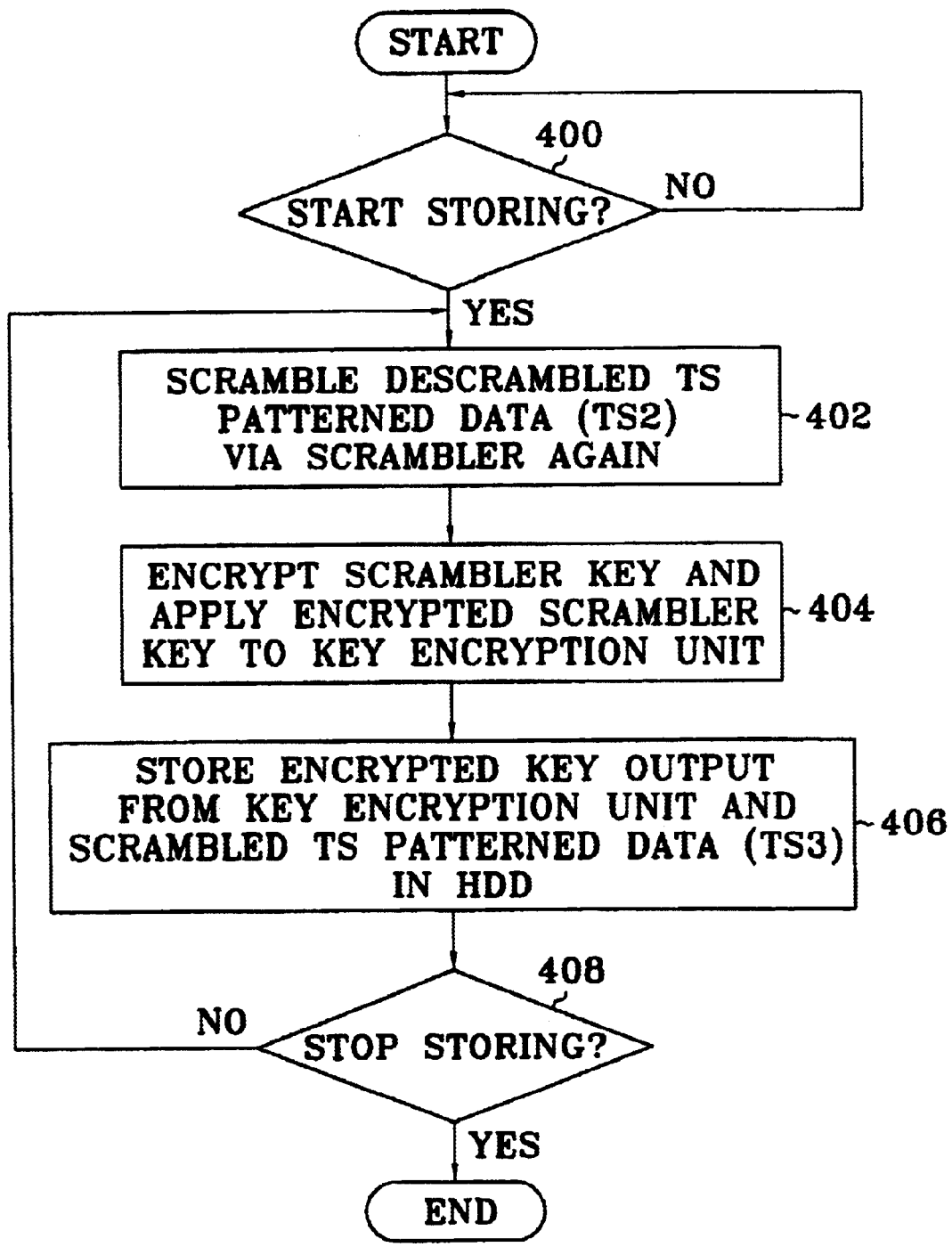

COPY PREVENTION APPARATUS AND METHOD IN DIGITAL BROADCASTING RECEIVING SYSTEM

CROSS-REFERENCE TO RELATED APPLICATIONS

Not Applicable

STATEMENT REGARDING FEDERALLY SPONSORED RESEARCH

Not Applicable

REFERENCE TO A MICROFICHE APPENDIX

Not Applicable

BACKGROUND OF THE INVENTION

1. Field of the Invention

The present invention relates to a broadcasting receiving system for receiving a digital broadcasting and storing the same, and more particularly, to a copy prevention apparatus and method in a digital broadcasting receiving system in which an unauthorized illegal copy of a broadcasting signal whose copyright should be protected is prevented when the broadcasting signal is stored in a storage medium.

2. Description of the Related Art

A hard disk drive (HDD) is an auxiliary storage device for use in computers, in which random access is possible, data transfer speed is high and its cost is lowerer than other auxiliary storage devices, to thereby however realize a large capacity. Recently, a digital versatile disc (DVD) is favored as a next-generation storage medium. A recent form of the DVD is a DVD-RAM free of recording and deletion of data. Accordingly, the HDD or DVD-RAM drive is used as a storage device in a broadcasting receiving system, to thereby enable a user to view a broadcasting program or store the same.

Meanwhile, a digital broadcasting employing a multi-channel and containing a plurality of programs for each channel has started. A digital broadcasting receiving system receives multi-channel digital audio/video data transmitted via a broadcasting station or network and reproduces and stores the received data. Generally, digital audio/video data is encoded by the MPEG (moving picture expert group) standard and is transmitted in the form of a digital transport stream (TS) packetized including data of a number of programs. Here, the data of the programs is encoded by an encryption or scramble method, and decoded only in a broadcasting receiving system where a view of programs is allowed.

The above-described prior art reference will be described in more detail with reference to FIG. 1 showing a schematic structure of a broadcasting receiving system adopting a general HDD.

In FIG. 1, a TS demultiplexer 100 extracts a key of an encrypted scrambler from data TS1 of an input scrambled TS pattern. The TS demultiplexer 100 decrypts a scrambler key extracted according to user information programmed in advance on a smart card 104. The decrypted scrambler key and the input TS patterned data TS1 are input to a descrambler 102. The descrambler 102 descrambles the input TS patterned data TS1 using a decrypted key applied from the TS demultiplexer 100. The descrambled TS patterned data TS2 is input to an audio/video (A/V) decoder 106 or a HDD interface unit 110 via the TS demultiplexer 100 under the control of a system controller 108 responding to a reproduction or storing request from a user. In the case that a user requests a reproduction operation, the A/V decoder 106 decodes the input descrambled TS patterned data TS2 to be displayed so that the user can view it. In the case that a user requests a storing operation, the HDD interface unit 110 stores the input descrambled TS patterned data TS2 in a HDD (not shown).

However, the above-described conventional broadcasting receiving system stores a broadcasting signal in the descrambled form when it is stored in a storage medium. For this reason, the contents of the storage medium are copied by an unauthorized third party, in which case the stored information cannot be protected from being illegally distributed.

SUMMARY OF THE INVENTION

To solve the above problems, it is an object of the present invention to provide a copy prevention apparatus and method for protecting stored information in a storage medium from being illegally duplicated by an unauthorized third party in which a broadcasting signal is scrambled when a broadcasting received from a digital broadcasting receiving system is stored in the storage medium.

To accomplish the above object of the present invention, there is provided a copy prevention apparatus for use in a digital broadcasting receiving system for receiving a digital multi-channel broadcasting and viewing and storing a desired program, the copy prevention apparatus comprising: a descrambler for extracting an encrypted key of a scrambler from scrambled transport stream (TS) patterned data received in correspondence to a desired channel, decrypting the extracted encrypted key, and descrambling the scrambled TS patterned data using the decrypted key; a scrambler for scrambling the descrambled TS patterned data again; a key encryption unit for decrypting the encrypted key of the scrambler and encrypting the decrypted key again, to thereby produce a new encryption key; a storage medium for storing the scrambled TS patterned data together with the produced encryption key; and a system controller for controlling the operation of each component so that data is stored after a copy prevention operation has been performed in response to a storing request from a user.

There is also provided a method for preventing a storage medium from being illegally copied in a digital broadcasting receiving system, the copy prevention method the steps of: (a) extracting an encrypted key of a scrambler from input scrambled transport stream (TS) patterned data; (b) decrypting the scrambler key extracted in step (a) and descrambling the scrambled TS patterned data using the decrypted key; (c) scrambling the descrambled TS patterned data again from step (b) in response to a storing request from a user, decrypting the encrypted scrambler key again and encrypting the decrypted key again, to thereby produce a new encryption key; and (d) storing the scrambled TS patterned data together with the encryption key produced in step (c).

BRIEF DESCRIPTION OF THE DRAWINGS

The above object and other advantages of the present invention will become more apparent by describing the preferred embodiment thereof in more detail with reference to the accompanying drawings in which:

FIG. 4 is a flow chart for explaining a copy prevention operation when data is stored in a HDD in the FIG. 2 system.

DETAILED DESCRIPTION OF THE INVENTION

A preferred embodiment of the present invention will be described with reference to the accompanying drawings.

Figure 1:
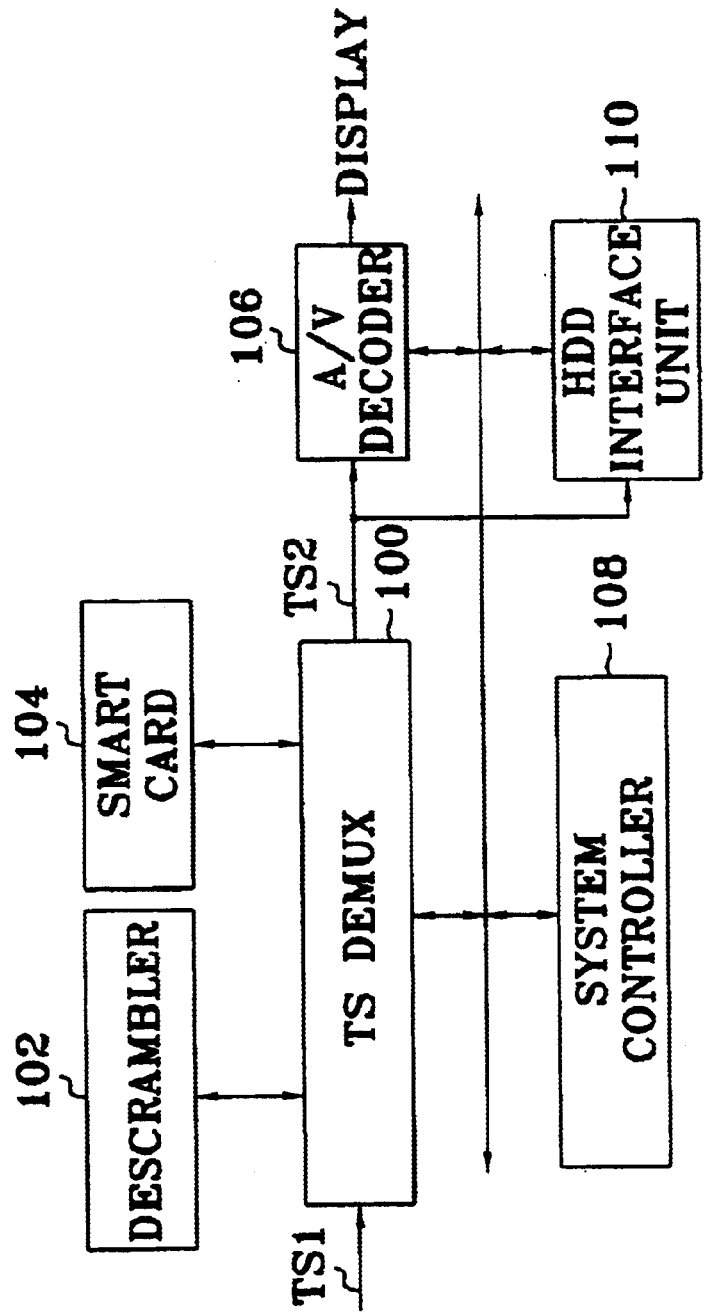
FIG. 1 is a block diagram showing a general broadcasting receiving system having a hard disc drive (HDD)
Figure 2:
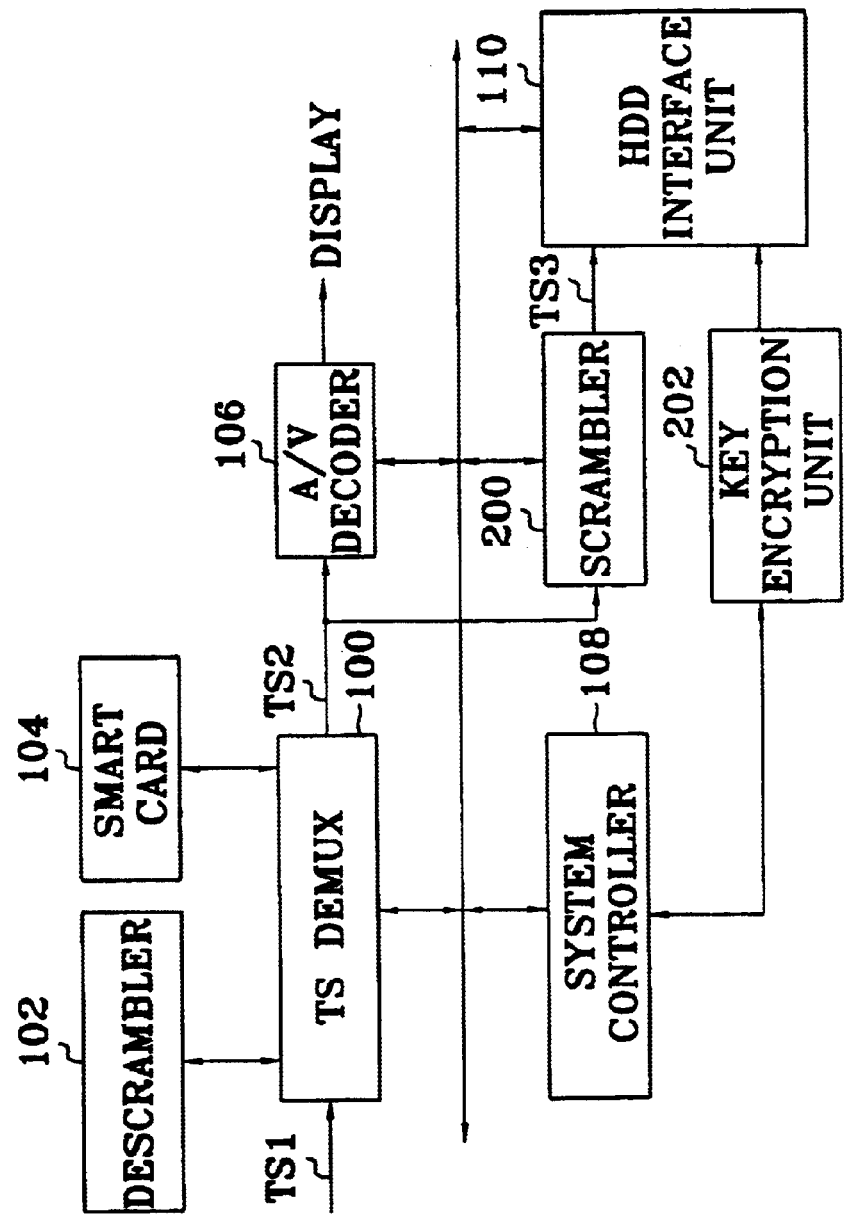
FIG. 2 is a block diagram showing a broadcasting receiving system having a HDD according to a preferred embodiment of the present invention.

FIG. 2 shows a broadcasting receiving system implementing a copy prevention function according to the present invention. The system shown in FIG. 2 includes the same blocks as those of FIG. 1, which perform the same functions as those of the corresponding blocks in the conventional broadcasting receiving system. Here, the blocks of FIG. 2 have the same reference numerals as those of the corresponding blocks of FIG. 1. In addition, The FIG. 2 system according to the present invention includes a scrambler 200 positioned at the input side of a hard disc drive (HDD) interface unit 110, for scrambling the descrambled transport stream (TS) patterned data TS2 again, and a key encryption unit 202 for producing a new encryption key.

The detailed structure of the key encryption unit 202 will be described with reference to FIG. 3.

Figure 3:
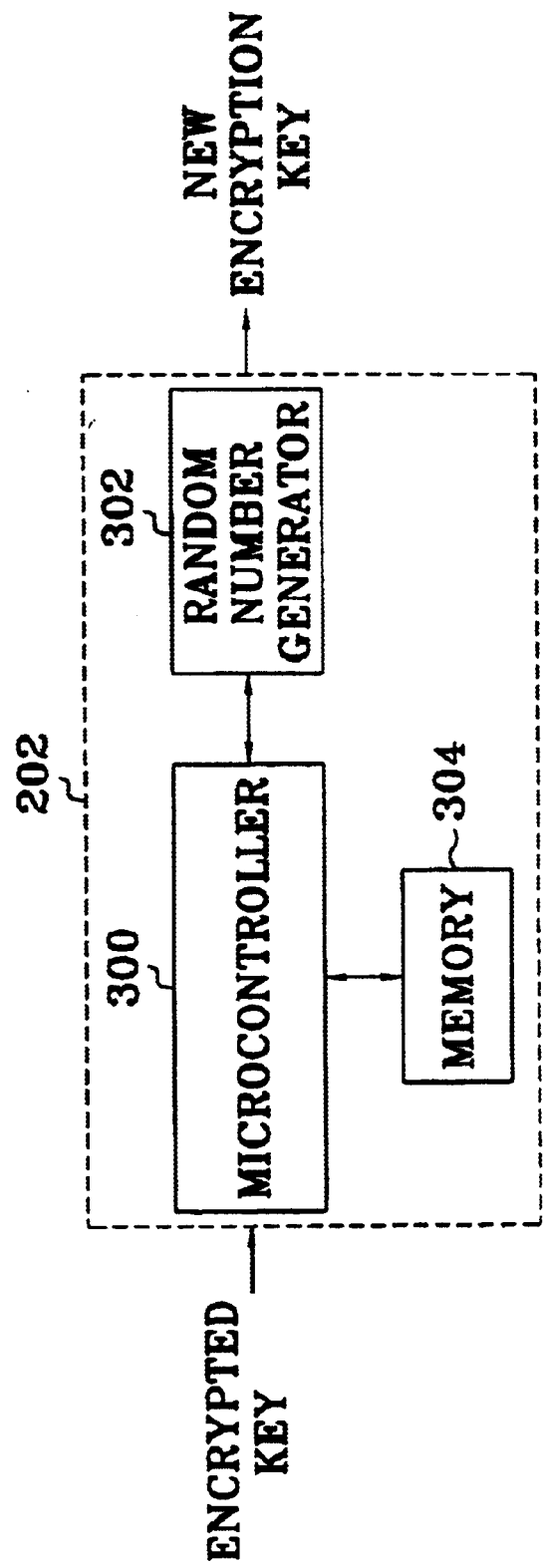
FIG. 3 is a block diagram showing the key encryption unit of the FIG. 2 system.

FIG. 3 is a block diagram showing the key encryption unit 202 of the FIG. 2 system. The key encryption unit 202 shown in FIG. 3 includes a random number generator 302 for generating a random number at the time when an initial operation of the corresponding system is performed, and a memory 304 storing the generated random number. Here, the random number generator 302 has a mutually different initial value for each broadcasting receiving system in order to prevent data stored in a hard disc drive (HDD) from being descrambled in other broadcasting receiving systems. The key encryption unit 202 of FIG. 3 also includes a microcontroller 300 for receiving an encrypted key of a scrambler from a TS demultiplexer 100 and decrypting the received key, and then newly encrypting the decrypted key using the random number stored in the memory 304 to thereby output the newly encrypted key. The operation of copy prevention in the digital broadcasting receiving system of FIG. 2 having the above constitution will be described in more detail with reference to FIG. 3 and FIG. 4.

In FIG. 2, if scrambled TS data TS1 is input via a network or a broadcasting station, the TS demultiplexer 100 selects a program data stream of a particular channel selected by a user among the scrambled TS data TS1 under the control of the system controller 108. The TS demultiplexer 100 transmits the selected particular channel program data stream to the descrambler 102, and then decrypts the encrypted scrambler key included in the input TS data TS1 according to user information programmed in a smart card 104 in advance, to then transmit the decrypted key to the descrambler 102. The descrambler 102 descrambles the input data stream using the decrypted scrambler key applied from the TS demultiplexer 100. The descrambled TS patterned data TS2 is supplied to an audio/video (A/V) decoder 106 and a scrambler 200 via the TS demultiplexer 100, respectively. The A/V decoder 106 decodes the descrambled TS patterned data TS2 supplied under the control of the system controller 108, to then be displayed on a display (not shown). Accordingly, the user can view a program with respect to a certain channel which is desired to be viewed.

Meanwhile, the scrambler 200 scrambles the descrambled TS patterned data TS2 supplied under the control of the system controller 108 once again, and supplies the scrambled TS patterned data TS3 so as to be stored in a HDD via the HDD interface unit 110. Here, the scrambler 200 uses a specific scrambler of a corresponding broadcasting receiving system manufacturer, in which a product serial number is used as a scrambler key. The key encryption unit 202 decrypts an encryption key applied from the TS demultiplexer 100 via the system controller 108, and then encrypts the decrypted key using the product serial number, to thereby produce a new encryption key. Although the encrypted scrambler key extracted from the TS demultiplexer 100 may be supplied to the key encryption unit 202 without any modification, the encrypted key can be exposed during transmission. For this reason, the decrypted key is encrypted again in the key encryption unit 202. The key encryption unit 202 may use a random number instead of a product serial number. That is, as shown in FIG. 3, the key encryption unit 202 stores, in the memory 304, the random number produced from the random number generator 302 at the time of the system initial operation. The microcontroller 300 in the key encryption unit 202 receives the encrypted scrambler key from the TS demultiplexer 100 and then decrypts the received scrambler key, and then encrypts the decrypted key again using the random number stored in the memory 304, to produce a new encryption key. The new encryption key is stored in the HDD via the HDD interface unit 110, together with the newly scrambled TS patterned data TS3. Accordingly, the user protects a copyright with respect to the program of the channel desired to be stored, so that the program can be stored. This operation will be described in more detail below. If a user inputs a storing command for storing a program desired to be stored, the system controller 108 performs a set of control operation in order to store data of the requested program desired to be stored in the HDD in response to the storing command. That is, as shown in FIG. 4, the system controller 108 performs a HDD copy prevention control operation in order to protect the information stored in the HDD when data is stored in the HDD, from being copied by an unauthorized third party.

FIG. 4 is a flow chart for explaining a copy prevention operation when data is stored in a HDD in the FIG. 2 system. In FIG. 4, the system controller 108 judges whether a storing operation starts according to an input of a storing command (step 400). If a storing operation has started in the result of the step 400 judgment. the system controller 108 controls the scrambler 200 to scramble again the TS patterned data TS2 of a corresponding program which has been descrambled and output from the TS demultiplexer 100 (step 402). Then, the system controller 108 encrypts the scrambler key by software and applies the encrypted result to the key encryption unit 202 (step 404). Here, a direct one-to-one correspondence relationship between the encrypted key produced from the key encryption unit 202 and a non-encrypted key prior to being applied to the key encryption unit 202 can be exposed when the key is applied from the system controller 108 to the key encryption unit 202 without being encrypted again. Thus, the reason why the newly encrypted key is applied to the key encryption unit 202, is for preventing a direct one-to-one correspondence relationship between the encrypted key produced from the key encryption unit 202 and a non-encrypted key prior to being applied to the key encryption unit 202 from being exposed. Accordingly, the key encryption unit 202 decrypts the encrypted key and then encrypts the decrypted key again to thereby produce a newly encrypted key. Then, the system controller 108 stores the encrypted key output from the key encryption unit 202 and the TS patterned data TS3 of a corresponding program scrambled in the scrambler 200 in the HDD via the HDD interface unit 110 (step 406). That is, the scrambler 200 scrambles the descrambled TS patterned data TS2 output from the TS demultiplexer 100 once again prior to being stored in the HDD. Then, the system controller 108 checks whether a storing stop command is input via a key inputter or a remote controller from the user (step 408). If there is no input storing stop command in step 408, the system controller 109 returns to step 402 and performs operations of the preceding steps 402–406, and scrambles the corresponding program TS patterned data TS2 and newly encrypts the scrambler key to then be stored in the HDD. Reversely, if a storing stop command has been input in step 408, the system controller 108 finishes the storing operation.

As described above, the copy prevention apparatus and method in the digital broadcasting receiving system according to the present invention scrambles again a descrambled data stream in a specific method and stores the scrambled result, when a received broadcasting signal is stored in a storage medium such as a HDD or a DVD-RAM drive, to thereby provide an effect of preventing an unauthorized person from copying the information stored in the storage medium.

What is claimed is:

1. A copy prevention apparatus for use in a digital broadcasting receiving system for receiving a digital multi-channel broadcasting and viewing and storing a desired program, the copy prevention apparatus comprising:

a descrambler for extracting an encrypted key of a scrambler from scrambled transport stream (TS) patterned data received in correspondence to a desired channel, decrypting the extracted encrypted key, and descrambling the scrambled TS patterned data using the decrypted key;

a scrambler for scrambling the descrambled TS patterned data again;

a key encryption unit for decrypting the encrypted key of the scrambler and encrypting the decrypted key again, to thereby produce a new encryption key;

a storage medium for storing the scrambled TS patterned data together with the produced encryption key; and a system controller for controlling the operation of each component so that data is stored after a copy prevention operation has been performed in response to a storing request from a user.

2. The copy prevention apparatus according to claim 1, wherein said descrambler encrypts the decrypted key and outputs the encrypted key to the key encryption unit.

3. The copy prevention apparatus according to claim 2, wherein said key encryption unit produces an encryption key using a random number.

4. The copy prevention apparatus according to claim 2, wherein said key encryption unit produces an encryption key using a product serial number.

5. The copy prevention apparatus according to claim 3, wherein said key encryption unit comprises:

a random number generator for generating a random number at the time of an initial operation;

a memory for storing the random number generated in said random number generator; and a microcontroller for decrypting the received encrypted scrambler key, and then newly encrypting the decrypted key using the random number stored in the memory, to thereby output the newly encrypted key.

6. The copy prevention apparatus according to claim 5, wherein said random number generator generates a mutually different initial value for each broadcasting receiving system, in order to prevent the data stored in the storage medium from being descrambled in other broadcasting receiving system.

7. The copy prevention apparatus according to claim 1, wherein said storage medium is a hard disc drive (HDD).

8. The copy prevention apparatus according to claim 1, wherein said storage medium is a digital versatile disc-random access memory (DVD-RAM) drive.

9. A method for preventing a storage medium from being illegally copied in a digital broadcasting receiving system, the copy prevention method the steps of:

(a) extracting an encrypted key of a scrambler from input scrambled transport stream (TS) patterned data;

(b) decrypting the scrambler key extracted in step (a) and descrambling the scrambled TS patterned data using the decrypted key;

(c) scrambling the descrambled TS patterned data again from step (b) in response to a storing request from a user, decrypting the encrypted scrambler key again and encrypting the decrypted key again, to thereby produce a new encryption key; and (d) storing the scrambled TS patterned data together with the encryption key produced in step (c).

10. The copy prevention method according to claim 9, wherein said step (b) further comprises the step of (b1) encrypting the decrypted key again.

11. The copy prevention method according to claim 10, wherein the decrypted key is encrypted to produce a new encryption key using a random number in said step (c).

12. The copy prevention method according to claim 10, wherein the decrypted key is encrypted to produce a new encryption key using a system serial number in said step (c).

* * * * *